United States Patent [19]

Fontaine

[11] Patent Number: 4,650,115
[45] Date of Patent: Mar. 17, 1987

[54] VEHICLE WHEEL TRACTION MAT

[76] Inventor: Serge Fontaine, 2719 N. Francisco Ave., Chicago, Ill. 60647

[21] Appl. No.: 763,395

[22] Filed: Aug. 7, 1985

[51] Int. Cl.⁴ .............................................. E01B 23/00
[52] U.S. Cl. ......................................... 238/14; 15/238
[58] Field of Search ....................... 152/208, 221, 222; 238/14; 15/238, 239; 296/1 F

[56] References Cited

U.S. PATENT DOCUMENTS

| | | | |
|---|---|---|---|
| 1,160,201 | 11/1915 | Ryberg | 15/239 |
| 3,858,803 | 1/1975 | Gantert | 15/239 |
| 3,872,908 | 3/1975 | Elnarsson | 152/208 |
| 4,346,748 | 8/1982 | Bagoy et al. | 152/221 X |

Primary Examiner—Donald E. Czaja
Assistant Examiner—Thomas Bokan
Attorney, Agent, or Firm—Wood, Dalton, Phillips, Mason & Rowe

[57] ABSTRACT

A traction mat is disclosed for use under a vehicle wheel to provide traction under conditions such as snow, ice, and the like. The mat includes a generally flat body having cleats which are movable relative to the body between inoperative condition substantially out of engagement with the ground and operative condition in engagement with the ground in response to the vehicle wheel moving over the mat. The cleats are disclosed as individual spike-like members reciprocally mounted within bores in respective elements of the body. The elements are formed in a series of generally parallel rows providing flexibility for the body. The spikes are axially movable relative to the body between inoperative positions and operative positions gripping the ground in response to the vehicle wheel moving over the spikes.

17 Claims, 5 Drawing Figures

VEHICLE WHEEL TRACTION MAT

BACKGROUND OF THE INVENTION

This invention relates to traction mats for use under vehicle wheels to provide traction under conditions such as ice, snow, mud, sand or clay or other loose soil, and the like.

Various devices or structures have been suggested for providing wheel traction assistance to motor vehicles and usually are in the form of a generally flat body for sliding against and partially beneath the vehicle wheel to provide for added traction. The flat body may have some sort of traction surface on the top side thereof for providing friction means against the periphery of the vehicle wheel. The bottom side of the mat has some sort of surface gripping means, such as cleats, undulations, or the like for gripping the snow, ice or other surface to provide traction where the vehicle otherwise would slip.

One of the major problems with traction mats heretofore available and as described above, is that the very cleats or undulations which are designed to grip the subjacent surface also cause a hindrance to slipping the mat into the angled juncture between the surface and the wheel periphery. Oftentimes, the wheel will simply engage and slip against the edge of the mat because the cleats or undulations make it practically impossible to manually slide the mat into the very narrow portion of the juncture between the surface and the wheel. In other words, the cleats or undulations are permanent fixtures on the underside of the mat and actually raise the mat off of the surface and prevent the mat from being manually positioned tightly between the wheel and the slippery surface.

This invention is directed to solving these and other problems by providing a novel traction mat which has cleat means physically movable relative to the mat body between inoperative and operative conditions in response to the vehicle wheel moving onto and over the mat.

SUMMARY OF THE INVENTION

An object, therefore, of the invention is to provide a new and improved traction mat for use under vehicle wheels to provide traction in emergency situations such as conditions of snow, ice and the like.

In the exemplary embodiment of the invention, the traction mat includes a generally flat body. Cleat means are mounted on the body for movement relative thereto between inoperative condition substantially out of engagement with the ground or subjacent surface and operative condition in engagement with the ground in response to the vehicle wheel moving over the mat.

As disclosed herein, the cleat means include a plurality of cleats individually mounted on the body for movement relative thereto between inoperative positions and operative positions in response to the vehicle wheel moving over the cleats. Each cleat comprises a spike-like member reciprocally mounted within a bore in the body. The spike has an upper head portion projecting from the top of the body for engagement by the vehicle wheel when the spike is in the inoperative position. The lower end of the spike projects from the bottom of the body for engaging the ground when the vehicle wheel moves the spike into the operative position. A coil spring surrounds the spike and is sandwiched between an upper surface portion of the body and the upper head portion of the spike. A recess is formed in the top of the body for accommodating the spring for each spike. A flexible, concave cover member is seated in the recess and covers the spring and the head of the spike. The concave cover forms an upper limit stop for movement of the spike and projects from the top of the body in inoperative condition for engaging the vehicle wheel to move the spike to its operative position in engagement with and gripping the ground.

As disclosed herein, the body is formed by a series of generally parallel rows of individual elements providing flexibility for the body. One of the cleats is individually mounted in each element. The rows of elements are held together by transverse rods.

Other objects, features and advantages of the invention will be apparent from the following detailed description taken in connection with the accompanying drawings.

DESCRIPTION OF THE DRAWINGS

The features of this invention which are believed to be novel are set forth with particularity in the appended claims. The invention, together with its objects and the advantages thereof, may be best understood by reference to the following description taken in conjunction with the accompanying drawings, in which like reference numerals identify like elements in the figures and in which:

DETAILED DESCRIPTION OF THE PREFERRED EMBODIMENT

Figure 1:
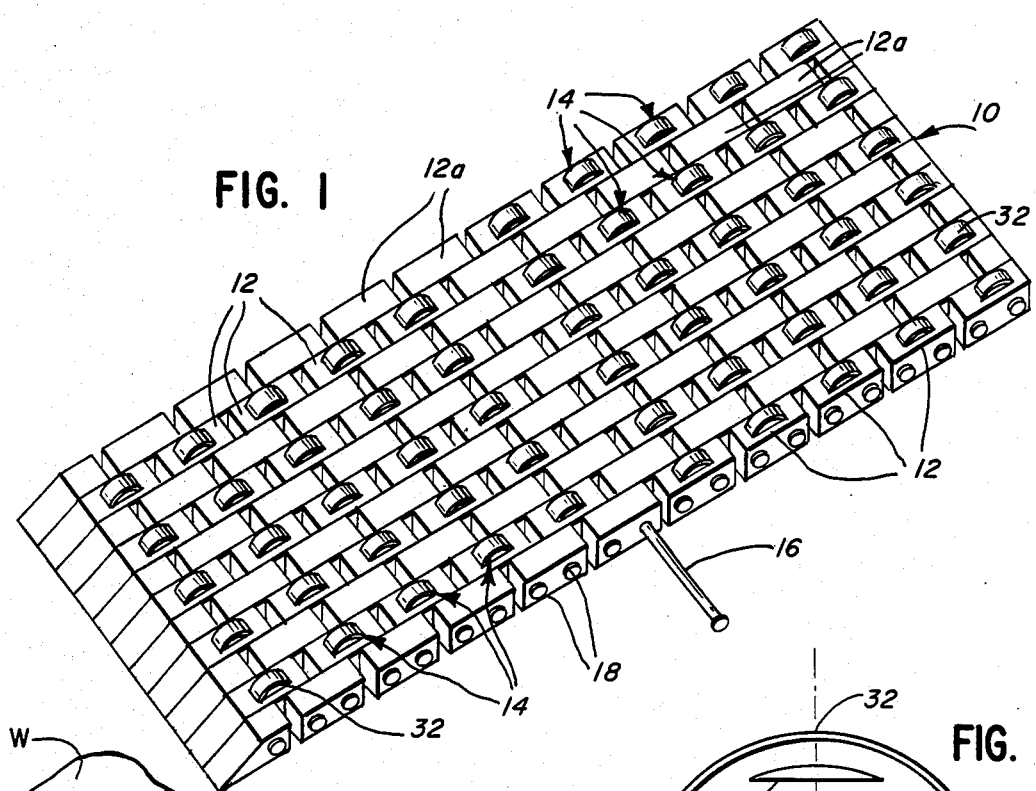
FIG. 1 is a perspective view of a traction mat according to the invention, with one of the support rods partially removed for illustration.

Referring to the drawings in greater detail, a traction mat, generally designated 10, is disclosed for use under a vehicle wheel to provide traction under conditions such as ice, snow, clay, sand, loose soil, and the like. The mat includes a generally flat body formed in part by a series of generally parallel rows of individual elements 12 providing flexibility for the mat. Each element 12 is in the form of a block of rubber, plastic, or like material and mounts an individual cleat, generally designated 14 in FIG. 1, which will be described in greater detail hereinafter. Certain blocks 12a may not be provided with individual cleats depending upon the configuration of traction elements desired on the underside of the mat. The blocks also are arranged in columns extending lengthwise of the mat (right-to-left in FIG. 1), and the blocks are staggered or positionally alternated in the columns in relation to the respective series of transverse rows. In this manner, support rods 16 can be inserted through horizontal apertures 18 in the blocks to hold the entire flat body in assembly.

Figure 2A:
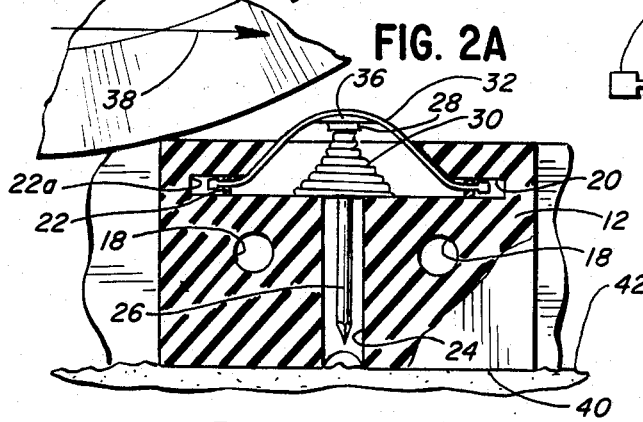
FIG. 2A is a fragmented vertical section, on an enlarged scale, of one of the individual elements of the mat body, with the respective cleat in inoperative condition.
Figure 2B:
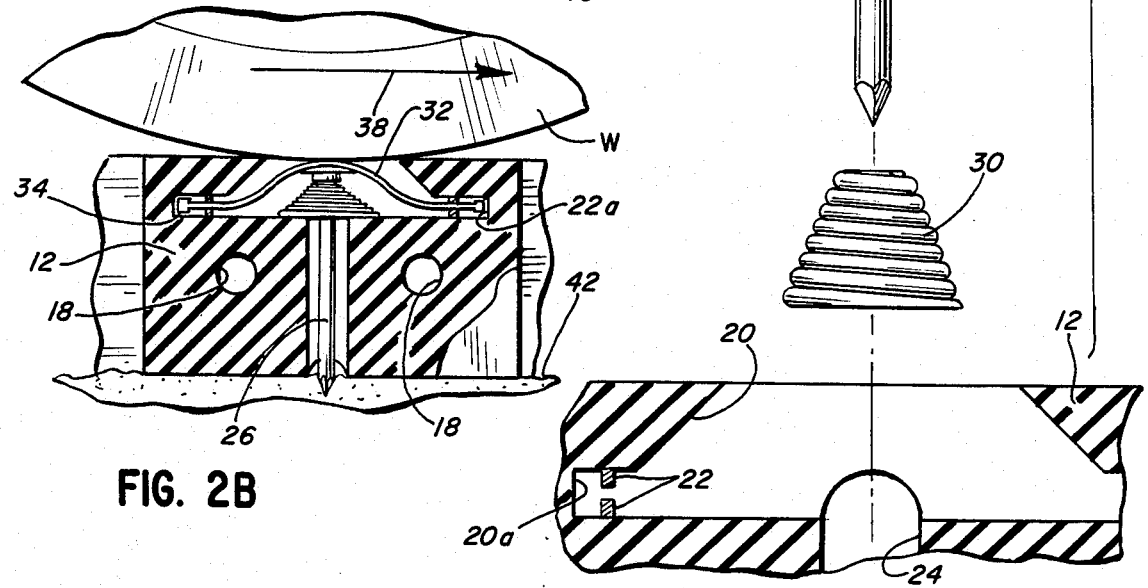
FIG. 2B is a view similar to that of Figure 2A, but with the cleat having been moved to operative or gripping condition by a vehicle wheel.
Figure 3:
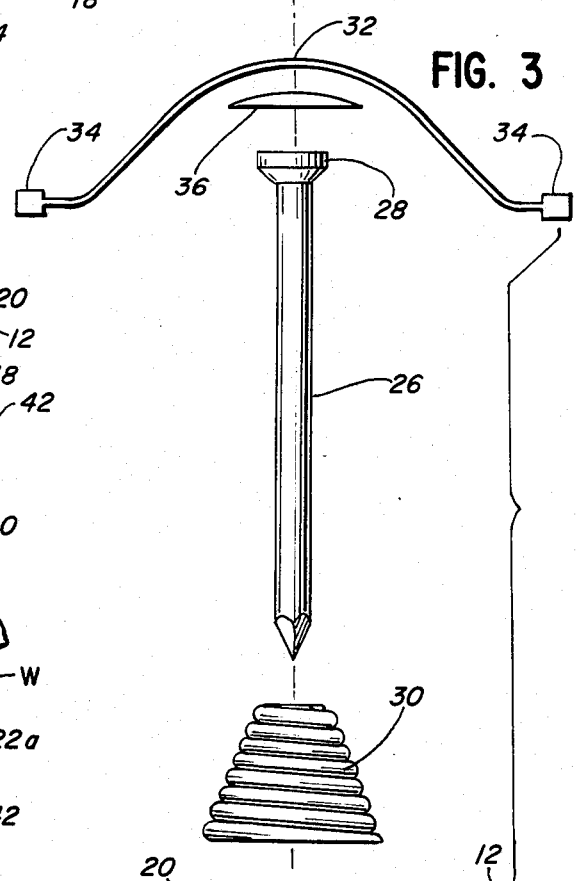
FIG. 3 is an exploded elevation of the component parts of one of the movable cleats of the invention.

Referring to FIGS. 2A-3, each block 12 is molded with a recess 20 in the top surface thereof. The recess has a blind peripheral interior channel 20a (FIG. 3)

provided with locking tabs 22, for purposes described hereinafter. Each block also has a vertical bore 24 centrally located through the block.

Each cleat 14 includes a spike-like member 26 having an upper head portion 28. A tapered coil spring 30 surrounds the spike and is sandwiched between the upper surface within recess 20 of the respective block and the upper head portion 28 of the spike. A flexible, concave cover member 32 is seated in recess 20 and covers spring 30 and the head of spike 26. The convex side of the cover projects from the top of block 12, when in an inoperative condition as shown in FIG. 2A, and forms an upper limit stop for movement of the spike. Enlargements 34 are fixed to the peripheral ends of cover 32 for snapping behind tabs 22 within blind channel 20a of recess 20. An inverted dish-shaped wear cap 36 is sandwiched between head 28 of spike 26 and the underside of cover 32. The cap normally is held sandwiched between the spike and the cover, but appropriate securing means may be provided to hold the wear cap in position.

With the above description, operation of the traction mat can best be visualized with reference to FIGS. 2A and 2B. Generally, FIG. 2A shows the cleat means in inoperative condition and FIG. 2B shows the cleat means in operative condition in response to a vehicle wheel "W" moving over the mat in the direction of arrows 38.

In inoperative condition, coil spring 30 biases spike 26 upwardly to an inoperative position as shown in FIG. 2A whereby the pointed distal end of the spike is located within the bounds of bore 24. Cover 32 projects upwardly beyond the top of block 12 and forms an upper limit stop for the spike. It can be seen that the underside 40 of block 12 thereby is unencumbered and substantially smooth for free slippage over the top of ground 42. Therefore, the traction mat can be easily slipped into the narrow juncture between the vehicle wheel and the ground.

In operative condition of the cleat means, spike 26 is driven downwardly, as viewed in FIG. 2B, into gripping penetration with the ground. This is in response to the vehicle wheel moving over the cleat means, engaging cover 32, and moving the spike axially downwardly within bore 24 of block 12. It should be noted that bore 24 is enlarged to facilitate the illustration. The bore should not be too large in cross-section to cause a sloppy fit with the spike and the bore should not be too small to cause binding with the spike.

From the foregoing, it can be seen that I have provided a novel traction mat for use under a vehicle wheel wherein the mat has cleat means normally in inoperative condition to permit easy positioning of the mat itself under the vehicle wheel, the cleat means being physically movable relative to the body of the mat in gripping engagement with the ground in response to the vehicle moving over the mat.

It will be understood that the invention may be embodied in other specific forms without departing from the spirit or central characteristics thereof. The present examples and embodiments, therefore, are to be considered in all respects as illustrative and not restrictive, and the invention is not to be limited to the details given herein.

Figure 4:
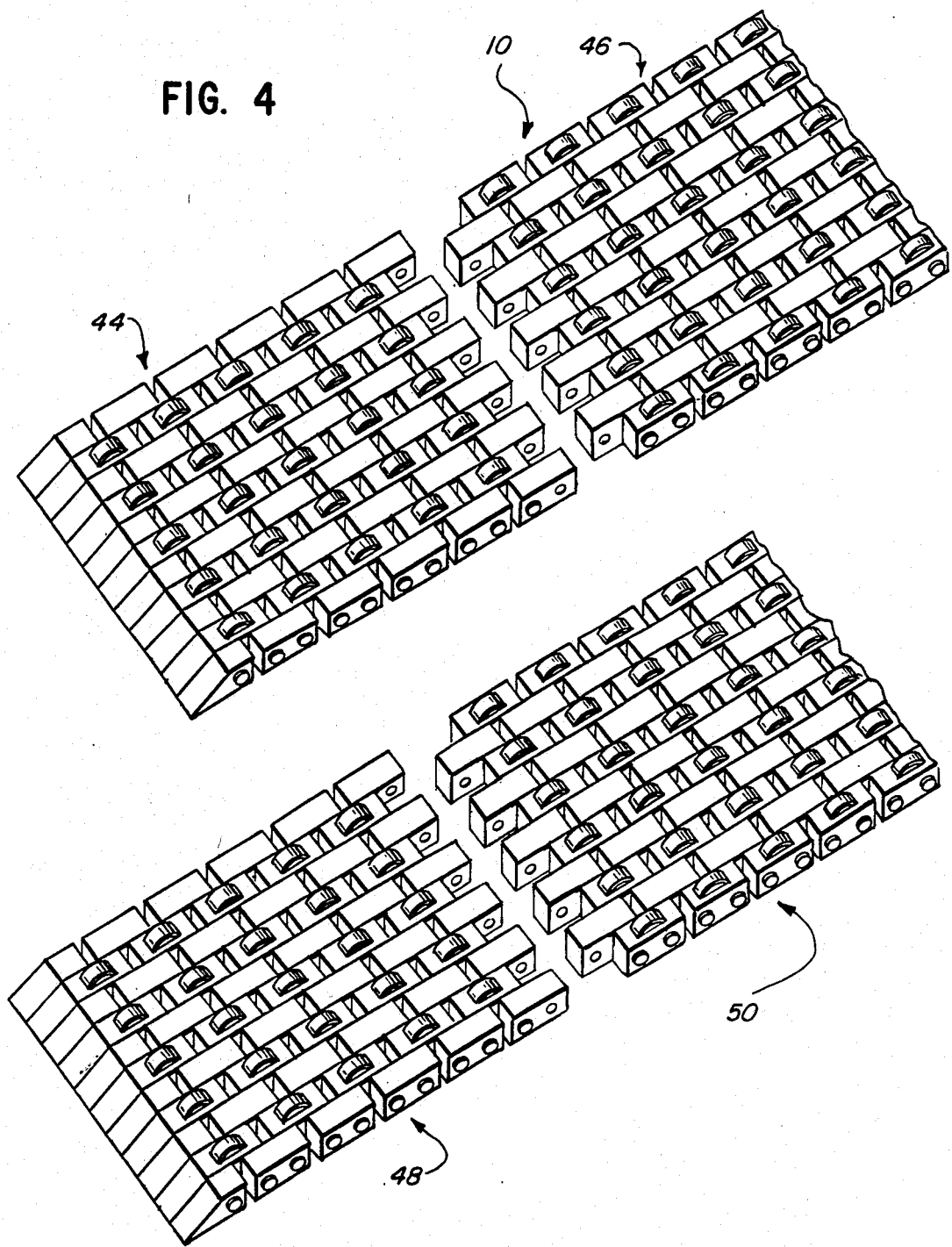
FIG. 4 is a perspective view of a pair of traction mats separated into four pieces.

In addition to providing a good traction in case of an emergency, the two mats can also be separated into four pieces 44,46,48,50 (FIG. 4) and placed over a rag, two pieces 44,46 on the floor in front of the front seat of the car and the other two pieces 48,50 in front of the rear seat, where the pieces will keep in place the towels that are placed on the floor to soak up the water from the melting snow coming from the passengers' feet.

Again, this is one more characteristic which makes the item unique of its kind in its uses as a traction mat and also as a means to protect the interior of the car against salty water or any other kind.

I claim:

1. A traction mat for use under a vehicle wheel, comprising:
   a generally flat body;
   cleat means mounted on the body for movement relative thereto between inoperative condition substantially out of engagement with the ground and operative condition in engagement with the ground, wherein said cleat means include a plurality of elongated cleat members projecting from the top of the body for engagement by the vehicle wheel when in said inoperative condition and projecting from the bottom of the body for engaging the ground when in said operative conditon; and
   the cleat means being movable between said conditions automatically in response to the vehicle wheel moving over the mat.

2. The traction mat of claim 1, including spring means operatively associated with each cleat for biasing the cleat toward its inoperative position.

3. The traction mat of claim 2 wherein each cleat comprises a spike-like member reciprocally mounted within a bore in the body, the spike having an upper head portion projecting from the top of the body for engagement by the vehicle wheel when the spike is in the inoperative position, the lower end of the spike projecting from the bottom of the body for engaging the ground when in the operative position.

4. The traction mat of claim 3 wherein the spring means comprises a coil spring surrounding the spike and sandwiched between an upper surface portion of the body and the upper head portion of the spike.

5. The traction mat of claim 4, including a recess in the top of the body for each spike and aligned with the respective bore, the coil spring being disposed within the recess.

6. The traction mat of claim, 5, including a flexible cover member seated in the recess and covering the spring and the head of the spike.

7. The traction mat of claim 6 wherein the cover member is convex in shape, projects from the top of the body in an inoperative condition and forms an upper limit stop for movement of the spike.

8. The traction mat of claim 1 wherein the body is formed by a series of generally parallel rows of individual elements providing flexibility for the body, with one of the cleats individually mounted on each element.

9. The traction mat of claim 1, including spring means operatively associated with said cleat means for biasing the cleat means toward said inoperative condition.

10. A traction mat for use under a vehicle wheel, comprising:
   a generally flat body formed by a series of generally parallel rows of individual elements providing flexibility for the body; and
   a cleat mounted on each element of the body for movement relative thereto between an inoperative position substantially out of engagement with the ground and an operative position in engagement with the ground automatically in response to the vehicle wheel moving over the mat the cleat projecting from the top of the body element for engagement by the vehicle wheel when in said inoperative position and projecting from the bottom of the element for engaging the ground when in said operative position.

11. The traction mat of claim 10, including spring means operatively associated with each cleat for biasing the cleat toward its inoperative position.

12. The traction mat of claim 11, wherein each cleat comprises a spike-like member reciprocally mounted within a bore in the body element, the spike having an upper head portion projecting from the top of the element for engagement by the vehicle wheel when the spike is in the inoperative position, the lower end of the spike projecting from the bottom of the element for engaging the ground when in the operative position.

13. The traction mat of claim 12 wherein the spring means comprises a coil spring surrounding the spike and sandwiched between an upper surface portion of the body element and the upper head portion of the spike.

14. The traction mat of claim 13, including recess in the top of the body for each spike and aligned with the respective bore, the coil spring being disposed with the recess.

15. The traction mat of claim 14, including a flexible cover member seated in the recess and covering the spring and the head of the spike.

16. The traction mat of claim 15 wherein the cover member is convex in shape, projects from the top of the body element in an inoperative condition and forms an upper limit stop for movement of the spike.

17. The traction mat of claim 10, including spring means operatively associated with said cleat for biasing the cleat toward said inoperative position.

* * * * *